United States Patent
Nalawadi et al.

(10) Patent No.: US 6,704,840 B2
(45) Date of Patent: Mar. 9, 2004

(54) COMPUTER SYSTEM AND METHOD OF COMPUTER INITIALIZATION WITH CACHING OF OPTION BIOS

(75) Inventors: Rejeev K. Nalawadi, Folsom, CA (US); Faraz A. Siddiqi, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 157 days.

(21) Appl. No.: 09/883,401

(22) Filed: Jun. 19, 2001

(65) Prior Publication Data

US 2003/0023812 A1 Jan. 30, 2003

(51) Int. Cl.[7] .............................................. G06F 13/00
(52) U.S. Cl. ...................... 711/118; 711/102; 711/165; 711/166; 711/170; 713/1; 713/2
(58) Field of Search ................................. 711/118, 165, 711/166, 170, 102, 103; 713/1, 2

(56) References Cited

U.S. PATENT DOCUMENTS

| | | | |
|---|---|---|---|
| 5,155,833 A | * 10/1992 | Cullison et al. ............... | 713/2 |
| 5,301,328 A | * 4/1994 | Begur et al. ................. | 711/201 |
| 5,408,636 A | * 4/1995 | Santeler et al. .............. | 711/163 |
| 5,671,413 A | * 9/1997 | Shipman et al. ............... | 713/2 |
| 5,809,531 A | * 9/1998 | Brabandt ...................... | 713/1 |
| 6,073,232 A | * 6/2000 | Kroeker et al. ................ | 713/2 |
| 6,282,644 B1 | * 8/2001 | Ko ............................ | 713/2 |
| 6,401,144 B1 | * 6/2002 | Jones ......................... | 710/33 |
| 6,539,456 B2 | * 3/2003 | Stewart ....................... | 713/2 |

OTHER PUBLICATIONS

"Method to Create an Initialization Mode CPU Cache," Research Disclosure Journal, RD 434034, Jun. 10, 2000, pp. 1–2.*

* cited by examiner

*Primary Examiner*—Glenn Gossage
(74) *Attorney, Agent, or Firm*—Schwegman, Lundberg, Woessner & Kluth, P.A.

(57) ABSTRACT

A computer system and method for computer initialization with caching includes enabling at least one cache memory and then copying an option basic input/output system (BIOS) from a first memory to a Programmable Attribute Map (PAM) main memory area, the copying including executing a cache-line fill to the at least one cache memory. Initialization is then performed by providing control to the option BIOS, the execution being performed substantially from the at least one cache memory. Processor Memory Type Range Registers (MTRRs) for the PAM memory area may be programmed as write-back. The at least one cache memory may be at least one of level 1 (L1) and level 2 (L2) processor cache memories. The first memory may be a flash memory or a ROM Read Only Memory (ROM). The at least one cache memory may be flushed upon completion of the option BIOS execution.

18 Claims, 5 Drawing Sheets

US 6,704,840 B2

COMPUTER SYSTEM AND METHOD OF COMPUTER INITIALIZATION WITH CACHING OF OPTION BIOS

BACKGROUND OF THE INVENTION

The present invention relates to computer initialization with caching and more particularly, the present invention relates to a technique which allows pre-boot software to cache the Programmable Attribute Map (PAM) areas used by option Read Only Memories (ROMs) to achieve faster initialization.

In currently used option ROM initialization techniques, the physical memory region of C000h, D000h, E000h and F000h segments (below 1 MB) are usually referred to as the Programmable Attribute Map (PAM) region(s). Typically the E000h and F000h segments (128K) are used by the System basic input/output system BIOS runtime code and the C000h and D000h segments are used by the Option ROM code (128K). The chipset provides the PAM attributes of Disabled, Read Only, Read/Write and Write-Only.

The following PAM attributes are utilized during the pre-operating system boot software execution.

1) Write-Only: This PAM attribute is used while copying the Option ROM to PAM memory
2) Read/Write: This PAM attribute is used while the Option ROM is given control and executing.
3) Read Only: This PAM attribute is used while the Option ROM has finished initialization and is being used for normal operation.

The Pre-OS boot software executes the following steps, for example, for Option ROM initialization:

1) The Option ROM code gets copied from a Flash memory firmware hub (FWH) for integrating Onboard components, and from the Peripheral Component Interconnect (PCI) Option ROM memory for PCI add-in cards to the PAM memory region (C000h and D000h) of the physical memory.
2) Pre-OS boot software gives control to the Option ROM for execution (Video BIOS, small computer system interface (SCSI) BIOS and Network BIOS) at different times during power-on self test (POST) execution.
3) The execution of the Option ROM code is completed.
4) The Pre-OS boot software continues with the normal tasks and enables caching for the PAM region.

In the current implementation of BIOSs of original equipment manufacturers (OEMs) and BIOS vendors, the PAM region is kept un-cacheable during the Option ROM initialization of the Video BIOS, SCSI BIOS and Network BIOS, etc., which increases the boot time so as to be on the order of seconds for multiple Option ROM execution(s).

The PAM memory area holds critical data that is necessary for the loading of the OS drivers (for example, Video drivers, SCSI drivers & Network drivers). Accordingly, the normal usage of the PAM attribute in the memory controller chipset is "Read Enable" after the shadowing of the Option ROM's and System BIOS runtime code. This is done to protect the contents of the PAM area.

The PAM memory area holds very critical data used by various OS drivers (Video drivers, SCSI drivers, Network drivers, OS Kernel loader using the INT15h e820, ACPI table pointer, Plug and Play Pointer, SMBIOS pointer, INT13h runtime interrupts used for loading the OS image, etc.)

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
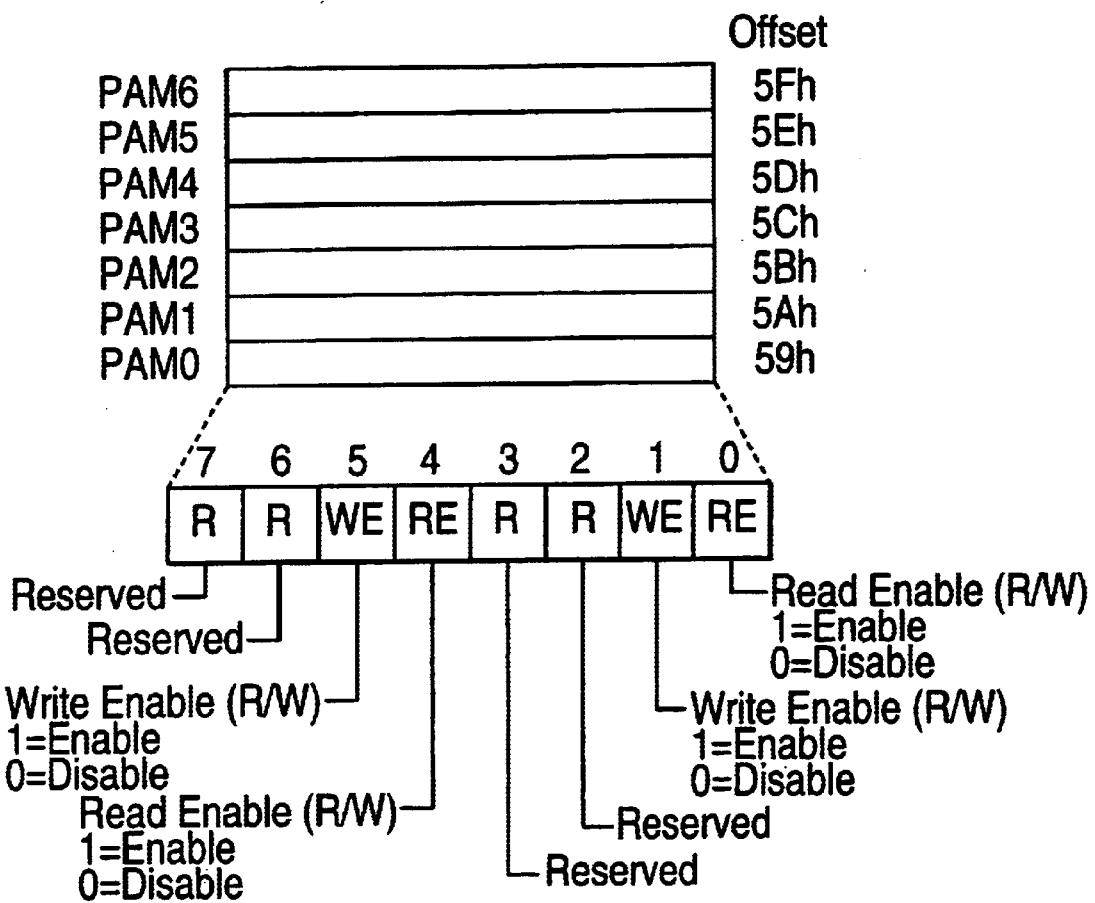
FIG. 1 illustrates the PAM registers and the associated attribute bits.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, arrangements may be shown in block diagram form in order to avoid obscuring the invention and also in view of the fact that specifics with respect to implementation of such block diagram arrangements are highly dependent upon the platform within which the present invention is to be implemented, that is, such specifics should be well within purview of one skilled in the art. Wherein specific details have been set forth in order to describe example embodiments of the invention, it should be apparent to one skilled in the art that the invention can be practiced without, or with variations of, these specific details. Finally, it should be apparent that differing combinations of hard-wired circuitry and software instructions can be used to implement embodiments of the present invention, that is, the present invention is not limited to any specific combination of hardware and software.

In order to speed up the initialization of a computer, the present invention allows the pre-boot software to cache the PAM areas used by option ROMs when the option ROM code gets copied from the flash memory or ROM memory to the PAM region of the physical memory. By enabling the cache memory during this copying of the code, upon the pre-boot software giving control to the option ROM for execution, the execution is performed using the code stored in the cache memory, thereby significantly decreasing the pre-operating system software boot time.

For a better understanding of the operation of the present invention, provided below is a brief discussion of the details of the PAM memory area.

The Memory Controller Chipset allows programmable memory attributes on the memory below 1 Mbyte (C000h to FFFFFh). This memory region is also commonly referred to as the PAM. The granularity of memory attribute control within this region comes in various sizes depending on the memory controller capability. In the most common implementation of a memory controller chipset, about seven Programmable Attribute Map (PAM) Registers (See FIG. 1) are used to support the programmable of the memory attributes in the region (C0000h to FFFFFh). In the memory controller, two bits are used to specify memory attributes for the PAM memory area memory segment (see TABLE 1). These bits apply to host, accelerated graphics port/peripheral component interconnect (AGP/PCI) and other bus master initiator accesses to the PAM areas. The processor memory cacheability of these areas is controlled via the Fixed MTRR (Memory Type Range Register) registers of the processor. These attributes are:

RE—Read Enable. When RE=1, the central processing unit (CPU) read accesses to the corresponding memory segment are claimed by the Memory controller and are directed to the main memory. Conversely, when RE=0, the host read accesses are directed towards the PCI Bus.

WE—Write Enable. When WE=1, the host write accesses to the corresponding memory segment are claimed by the Memory controller and are directed to the main memory. Conversely, when WE=0, the host write accesses are directed towards the PCI Bus.

The RE and WE attributes permit a memory segment to be Read Only, Write Only, Read/Write, or disabled. For example, if a memory segment has RE=1 and WE=0, then the segment is Read Only.

In the most common implementation found in the memory controller chipset, each PAM Register controls two regions, typically 16 KByte in size. Each of these regions has a 4-bit field, for example. The four bits that control each region have the same encoding and are defined in the following Table I.

An Example of Attribute Bit Assignment

TABLE 1

| Bits [7, 3] Reserved | Bits [6, 2] Reserved | Bits [5, 1] WE | Bits [4, 0] RE | Description |
|---|---|---|---|---|
| X | X | 0 | 0 | Disabled. Memory for this region is disabled and all accesses are directed towards the non-memory interface |

TABLE 1-continued

| Bits [7, 3] Reserved | Bits [6, 2] Reserved | Bits [5, 1] WE | Bits [4, 0] RE | Description |
|---|---|---|---|---|
| X | X | 0 | 1 | Read Only. Reads are forwarded to memory and writes are forwarded towards the non-memory interface |
| X | X | 1 | 0 | Write Only. Writes are forwarded to memory and reads are forwarded towards the non-memory interface. |
| X | X | 1 | 1 | Read/Write. This is the normal operating mode of memory. Both read and write cycles are forwarded to memory. |

As an example of a usage model, the System BIOS is normally present on the non-memory interface and during the initialization process. The System BIOS image can be shadowed into the main memory to increase the system performance. When the System BIOS is shadowed into the main memory, it should be copied to the PAM memory region. To shadow the BIOS, the PAM attributes for that address range should be set to "write-only". On some older bus architectures, such as industry standard architecture (ISA), the BIOS is shadowed by first performing a read of that address. This read is forwarded to the non-memory interface. The host then performs a write to the same address with the data, which is directed to the main memory. In a PCI Bus and an AGP Bus implementation, the Option ROM code gets copied from the memory-mapped PCI range to the PAM memory region. After the BIOS has been completely shadowed, the attributes for that memory region. After the BIOS has been completely shadowed, the attributes for that memory area are set to read only so that all writes are forwarded to the non-memory interface. FIG. 1 and Table II below illustrate the PAM registers and the associated attribute bits:

Example of PAM Registers and Associated Memory Segments for Memory Controller Chipset

TABLE II

| PAM Reg | Attribute Bits | | | | Memory Segment | Comments | Offset |
|---|---|---|---|---|---|---|---|
| PAM0[3:0] | Reserved | | | | | | 59h |
| PAM0[7:4] | R | R | WE | RE | 0F0000h–0FFFFFh | BIOS Area | 59h |
| PAM1[3:0] | R | R | WE | RE | 0C0000h–0C3FFFh | ISA Add-on BIOS | 5Ah |
| PAM1[7:4] | R | R | WE | RE | 0C4000h–0C7FFFh | ISA Add-on BIOS | 5Ah |
| PAM2[3:0] | R | R | WE | RE | 0C8000h–0CBFFFh | ISA Add-on BIOS | 5Bh |
| PAM2[7:4] | R | R | WE | RE | 0CC000h–0CFFFFh | ISA Add-on BIOS | 5Bh |
| PAM3[3:0] | R | R | WE | RE | 0D0000h–0D3FFFh | ISA Add-on BIOS | 5Ch |
| PAM3[7:4] | R | R | WE | RE | 0D4000h–0D7FFFh | ISA Add-on BIOS | 5Ch |
| PAM4[3:0] | R | R | WE | RE | 0D8000h–0DBFFFh | ISA Add-on BIOS | 5Dh |
| PAM4[7:4] | R | R | WE | RE | 0DC000h–0DFFFFh | ISA Add-on BIOS | 5Dh |
| PAM5[3:0] | R | R | WE | RE | 0E0000h–0E3FFFh | BIOS Extension | 5Eh |
| PAM5[7:4] | R | R | WE | RE | 0E4000h–0E7FFFh | BIOS Extension | 5Eh |
| PAM6[3:0] | R | R | WE | RE | 0E8000h–0EBFFFh | BIOS Extension | 5Fh |
| PAM6[7:4] | R | R | WE | RE | 0EC000h–0EFFFFh | BIOS Extension | 5Fh |

The Option ROM Shadow Area (C0000h–DFFFFH) is a 128 KByte area which is divided into eight 16 KByte segments which can be assigned different attributes via the PAM control register as defined by the Table II above. This memory region usually has, for example, the Video BIOS, SCSI BIOS, and local area network (LAN) BIOS.

The System BIOS Shadow Area-1 (E0000h–EFFFFh) is a 64 KByte area which is divided into four 16 KByte segments which can be assigned different attributes via the PAM control register as defined by the Table II above.

The System BIOS Shadow Area-2 (F0000h–FFFFFh) is an area consisting of a single 64 KByte segment which can be assigned different attributes via the PAM control register as defined by the Table II above.

Figure 2:
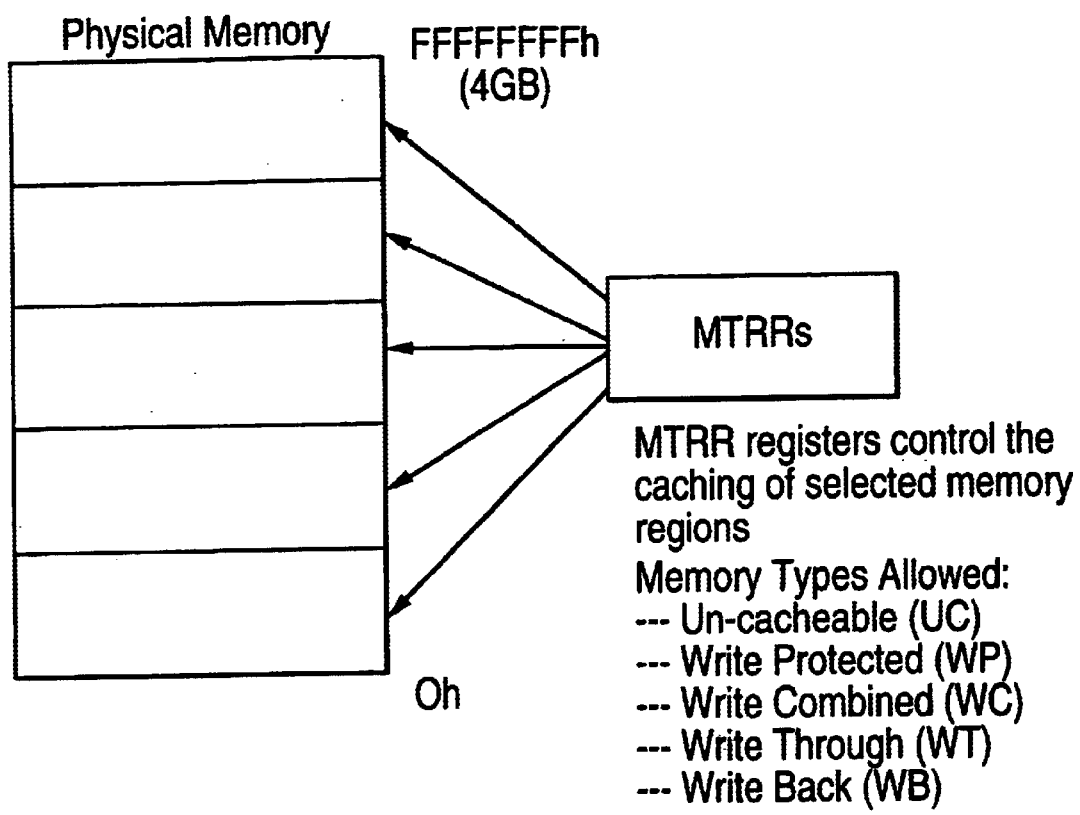
FIG. 2 illustrates Memory Type Range Registers (MTRRs) and memory mapping.

The following is a brief discussion of MTRRs and memory mapping. As shown in FIG. 2, the Memory Type Range Registers (MTRRs) define the cache characteristics for processor addressable memory space. The terminology used for MTRRs may vary but they all utilize the same underlying concept. For example, there may be two types of MTRRs available on a processor, namely:

1) Fixed MTRRs—which define the cache attributes for addressable memory from 0 MB to 1 MB. The fixed MTRRs may comprise the following registers:

Register MTRRfix64K 00000: This register maps the 512 KByte address range from 0H to 7FFFFH. This range is divided into eight 64 KByte sub-ranges.

Registers MTRRfix16K 80000 and MTRRfix16K A0000: These two registers map the two 128 Kbyte address ranges from 80000H to BFFFFH. This range is divided into sixteen 16 KByte sub-ranges, 8 ranges per register.

Registers MTRRfix4K C0000 and MTRRfix4K F8000: These two registers map eight 32-KByte address ranges from C0000H to FFFFFH. This range is divided into sixty-four 4 KByte sub-ranges, 8 ranges per register.

2) A number, e.g. 8, of variables MTRRs may define the cache attributes for addressable memory from 1 MB to 64 GB, with 6 of the variable MTRRs being controlled by Pre-OS boot software (for example, System BIOS and extensible firmware interface (EFI Modules) and 2 of the variable MTRRs being controlled by the OS. The MTRRs can address memory ranges only on a power of 2.

Figure 3:
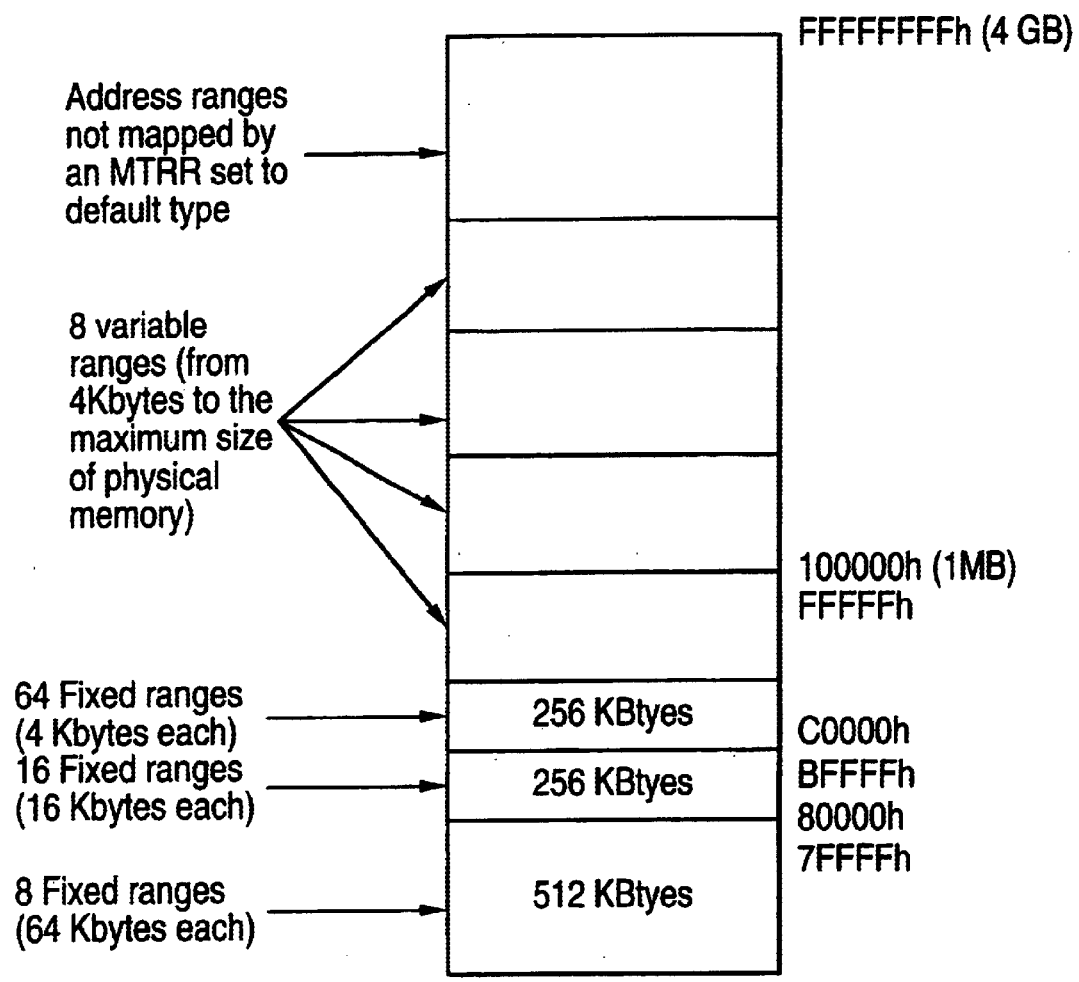
FIG. 3 illustrates the mapping of physical memory with an MTRR.

This is illustrated in Table III below and FIG. 3.

TABLE III

| Variable MTRR's |
| --- |
| MTRRPhysBase0 |
| MTRRPhysMask0 |
| MTRRPhysBase1 |
| MTRRPhysMask1 |
| MTRRPhysBase2 |
| MTRRPhysMask2 |
| MTRRPhysBase3 |
| MTRRPhysMask3 |
| MTRRPhysBase4 |
| MTRRPhysMask4 |
| MTRRPhysBase5 |
| MTRRPhysMask5 |
| OS Owned |
| MTRRPhysBase6 |
| MTRRPhysMask6 |
| OS Owned |
| MTRRPhysMask7 |
| MTRRPhysMask7 |

The un-cacheable (UC) MTRR cache attribute overrides the other cache attributes, that is, Write-Back (WB), Write Through (WT), Write Protect (WP), and Write-Combining (WC)

A MESI (modified, exclusive, shared, invalid) cache protocol is typically followed on all processors to maintain consistency with internal caches and caches in other processors.

Cache line fill: When the processor recognizes that an operand being read from memory is cacheable, the processor reads an entire cache line into the appropriate cache (L1, L2, or both). This operation is called a cache line fill.

Cache hit: If the memory location containing that operand is still cached, the next time the processor attempts to access the operand, the processor can read the operand from the cache instead of going back to memory. This operation is called a cache hit.

Write hit: When the processor attempts to write an operand to a cacheable area of memory, it first checks to see if a cache line for that memory location exists in the cache. If a valid cache line does exist, the processor (depending on the write policy currently in force) can write the operand into the cache instead of writing it out to system memory. This operation is called a write hit.

The un-cached (UC) memory type forces a strong-ordering model on memory accesses. That is, all reads and writes to the UC memory region appear on the front side bus of the processor and all code fetches go out to memory. Any out-of-order or speculative accesses are not performed.

For areas of memory where weak ordering is acceptable, the write back (WB) memory type can be chosen. Here, reads can be performed speculatively and writes can be buffered and combined. For this type of memory, cache locking is performed on atomic (locked) operation that do not split across cache lines, which helps to reduce the performance penalty associated with the use of the typical synchronization instructions, such as XCHG, that lock the bus during the entire read-modify-write (RMW) operation. With the WB memory type, the XCHG instruction locks the cache instead of the bus if the memory access is contained within a cache line. Also, the use of a WB cache attribute can reduce the performance penalty associated with the code fetch having to access the memory for the Option ROM code execution.

In the technique in accordance with the present invention, the cache is enabled during Option ROM initialization so that the code can be executed much faster, thus reducing the Pre-OS software boot time by a huge order of milliseconds per Option ROM and even in terms of seconds when multiple Option ROMs are considered.

Briefly, in the technique in accordance with the present invention, at least one cache memory, which may or may not be contained within the computer system processor, is enabled initially. Then, an option BIOS is copied from a first memory to a PAM main memory area, the copying including executing a cache-line fill to the at least one cache memory and then, initialization is performed by providing control to the option BIOS for execution, the execution being performed substantially, if not entirely, from the at least one cache memory.

Figure 4:
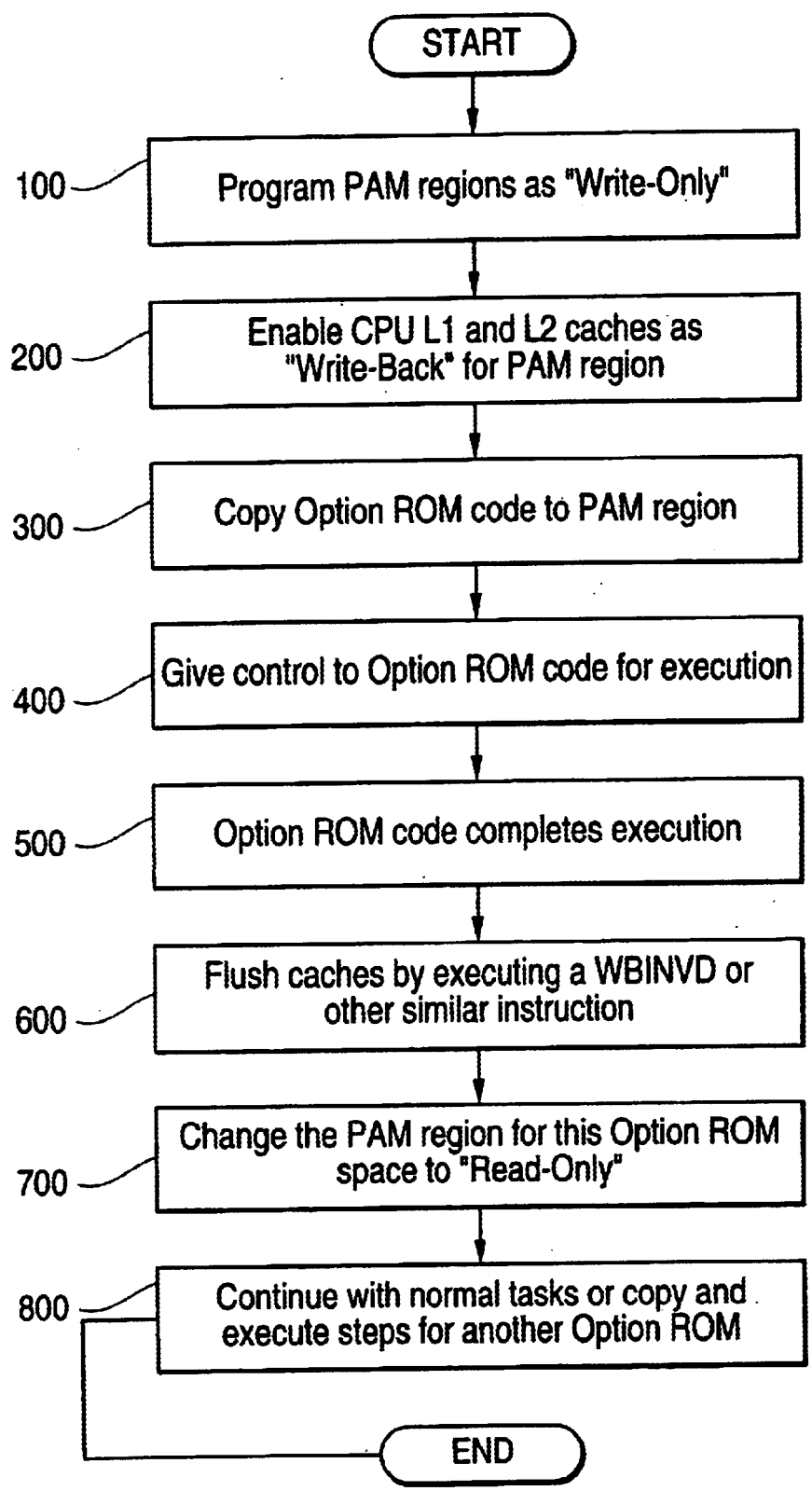
FIG. 4 is a flowchart illustrating the steps performed in an example of the computer initialization with caching technique of the present invention.

In greater detail, the following steps are executed to initialize the Option ROMs during Pre-OS boot software execution using one illustrative example of the technique in accordance with the present invention as illustrated in FIG. 4:

100. Program the processor MTRRs for the C000h & D000h segment(s), that is, PAM regions, as "Write-Only".

200. Enable the CPU L1 & L2 cache as "Write-BACK" for PAM regions by programming the processor CR0 register appropriately (CD Bit 29=0 and NW Bit 30=0).

300. Copy the Option ROM code from the Flash memory (FWH for integrated Onboard components) and from the PCI Option ROM memory for PCI add-in cards to the PAM region (C000h and D000h) of memory. During this step, since the PAM memory region (C000h & D000h segment(s)) has a Write back cache attribute, the processor will execute a cache-line fill.

400. After the Option ROM has been copied into memory, the Pre-OS boot software gives control to the Option ROM for execution (the Video BIOS, SCSI BIOS and Network BIOS, for example) during POST execution. Since the processor has performed a cache-line fill for this memory region, the code execution can take place entirely from the processor cache and thus will result in cache-hits and write hits. This helps reduce the performance penalty associated with the un-cacheable attribute that has to execute a code fetch every time.

500. The Option ROM code then completes its execution.

600. During the execution of the Option ROM, write-hits may have occurred due to the Option ROM code, so the software then executes a flush of the cache by executing a Write-Back Invalidate (WBINVD) or any other similar flush instruction, depending on the processor architecture, before changing the Programmable Attribute Map (PAM) attributes for the associated segment(s) to be Read-Only.

700. Change the PAM region for this Option ROM space to "Read-Only".

800. The Pre-OS boot software then continues with the normal tasks or the copy and execute steps for another Option ROM.

Figure 5:
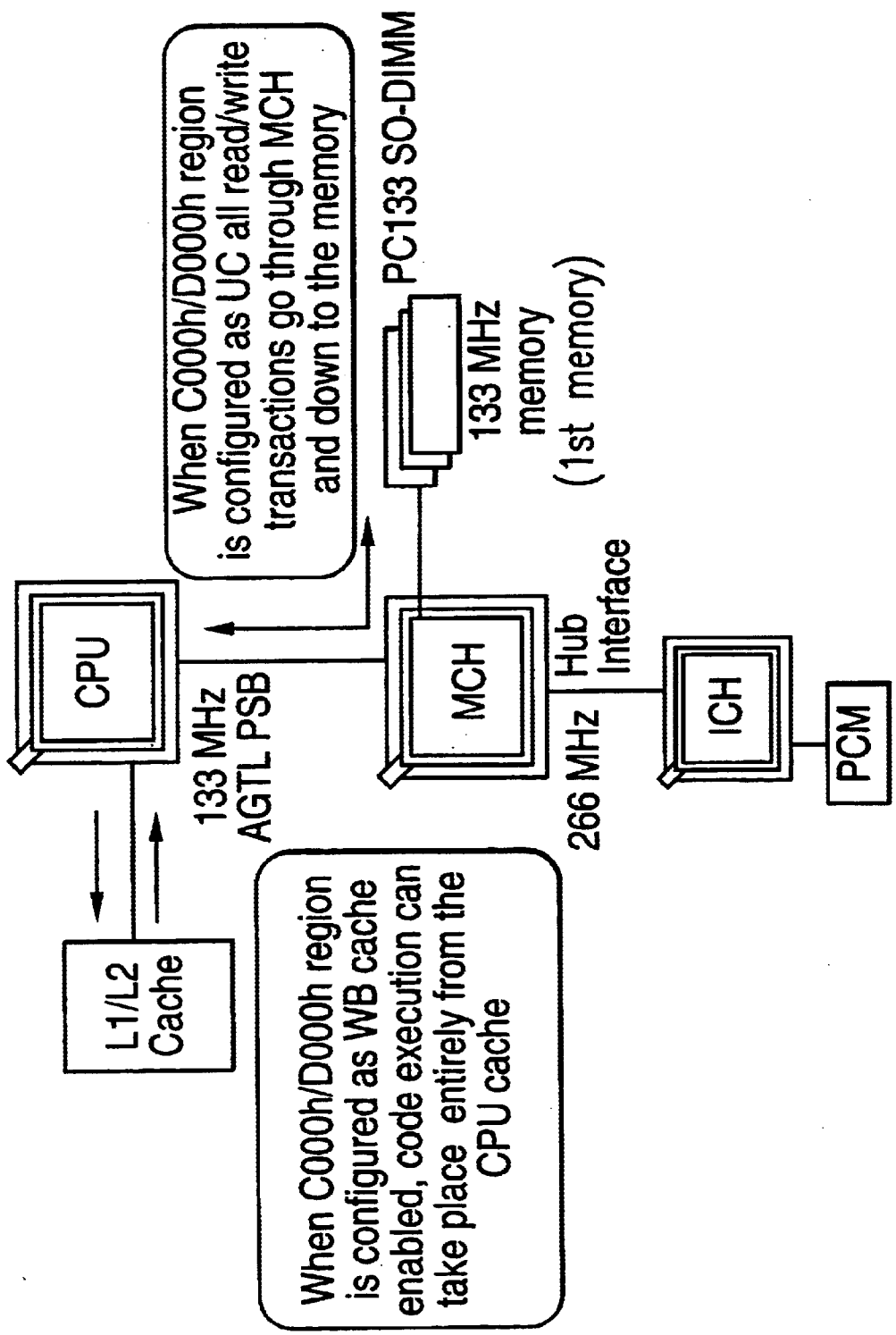
FIG. 5 is a block diagram illustrating an example of a platform which may be used in conjunction with the computer initialization with caching technique of the present invention.

FIG. 5 illustrates an example of a platform which may be used with the initialization with caching technique in accordance with the present invention.

The MCH in FIG. 5 represents the memory controller chipset, and ICH represents the I/O Controller that handles the PCI bus and other functionalities, such as the Interrupt controller, direct memory access (DMA) controller, Timers Flash memory components, etc. The $L_1/L_2$ cache has been shown as a separate element but is usually integrated into the CPU.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of initialization with caching, the method comprising:
    enabling at least one cache memory;
    copying an option BIOS (basic input/output system) from a first memory to a PAM (Programmable Attribute Map) main memory area, the copying including executing a cache-line fill to the at least one cache memory; and
    performing initialization by providing control to the option BIOS for execution, the execution being performed substantially from the at least one cache memory.

2. The method of claim 1, further comprising programming processor MTRRs (Memory Type Range Registers) for the PAM main memory area as write-back.

3. The method of claim 1, wherein enabling at least one cache memory comprises enabling at least one of level 1 (L1) and level 2 (L2) processor cache memories.

4. The method of claim 1, wherein the first memory comprises a flash memory.

5. The method of claim 1, wherein the first memory comprises a ROM (Read Only Memory).

6. The method of claim 1, further comprising flushing the at least one cache memory upon completion of the option BIOS execution.

7. A computer system comprising:
    a processor;
    at least one cache memory coupled to said processor;
    a main memory coupled to said processor; and
    a first memory having at least one option BIOS (basic input/output system) stored therein;
    wherein initialization of the computer system is performed by enabling said at least one cache memory and then copying said at least one option BIOS from said first memory to a PAM (Programmable Attribute Map) area of said main memory, the copying including executing a cache-line fill to the at least one cache memory, and then performing initialization by providing control to said at least one option BIOS for execution, the execution being performed substantially from the at least one cache memory.

8. The system of claim 7, wherein initialization of the computer system includes programming processor MTRRs (Memory Type Range Registers) for said PAM main memory area as write-back.

9. The system of claim 7, wherein said at least one cache memory comprises at least one of L1 and L2 processor cache memories.

10. The system of claim 7, wherein said first memory comprises a flash memory.

11. The system of claim 7, wherein said first memory comprises a ROM (Read Only Memory).

12. The system of claim 7, wherein said at least one cache memory is flushed upon completion of said at least one option BIOS execution.

13. A program storage device readable by a machine, tangibly embodying a program of instructions executable by the machine to perform a method of initialization with caching, the method comprising:
    enabling at least one cache memory;
    copying an option BIOS (basic input/output system) from a first memory to a PAM (Programmable Attribute Map) main memory area, the copying including executing a cache-line fill to the at least one cache memory; and
    performing initialization by providing control to the option BIOS for execution, the execution being performed substantially from the at least one cache.

14. The device of claim 13, further comprising programming processor MTRRs (Memory Type Range Registers) for the PAM main memory area as write-back.

15. The device of claim 13, wherein enabling at least one cache memory comprises enabling at least one of L1 and L2 processor cache memories.

16. The device of claim 13, wherein the first memory comprises a flash memory.

17. The device of claim 13, wherein the first memory comprises a ROM (Read Only Memory).

18. The device of claim 13, further comprising flushing the at least one cache memory upon completion of the option BIOS execution.

* * * * *

UNITED STATES PATENT AND TRADEMARK OFFICE
CERTIFICATE OF CORRECTION

PATENT NO.    : 6,704,840 B2
DATED         : March 9, 2004
INVENTOR(S)   : Nalawadi et al.

It is certified that error appears in the above-identified patent and that said Letters Patent is hereby corrected as shown below:

Title page,
Item [75], Inventors, delete "Rejeev" and insert -- Rajeev --, therefor.

Signed and Sealed this

Twenty-seventh Day of July, 2004

JON W. DUDAS
*Acting Director of the United States Patent and Trademark Office*